P. C. SCHMIDT.
NUT LOCK.
APPLICATION FILED MAY 10, 1911.

1,016,367.

Patented Feb. 6, 1912.

Witnesses

Inventor
Paul C. Schmidt
By Victor J. Evans
Attorney

UNITED STATES PATENT OFFICE.

PAUL C. SCHMIDT, OF DETROIT, MICHIGAN.

NUT-LOCK.

1,016,367.

Specification of Letters Patent.

Patented Feb. 6, 1912.

Application filed May 10, 1911. Serial No. 626,192.

*To all whom it may concern:*

Be it known that I, PAUL C. SCHMIDT, a citizen of the United States, residing at Detroit, in the county of Wayne and State of Michigan, have invented new and useful Improvements in Nut-Locks, of which the following is a specification.

This invention relates to improvements in nut locks, the primary object of the invention being to provide a device of this character which is of an extremely simple construction, which may be applied to a nut of any formation, which may be removed from the said nut to release the bolt, which will not injure the threads of the bolt, and which will perform its function with ease and with accuracy.

With the above objects in view, and others which will appear as the nature of the invention progresses, the invention resides in the novel construction and arrangement of parts hereinafter more fully described and claimed.

Figure 1:
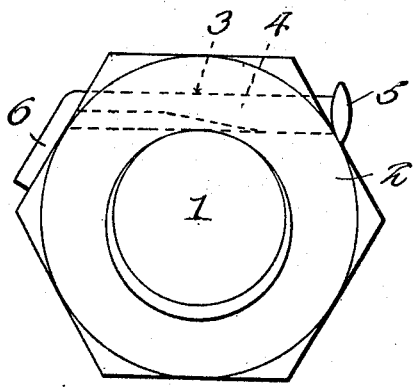
Figure 2:
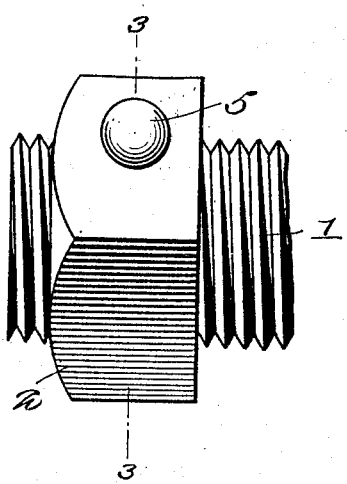
Figure 3:
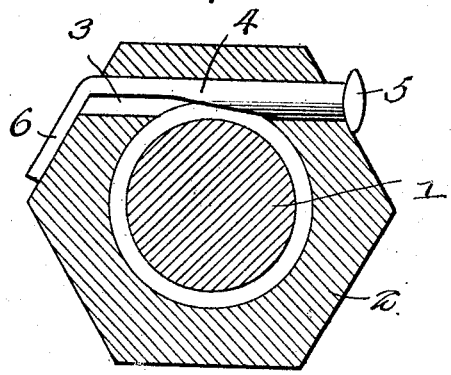
Figure 4:
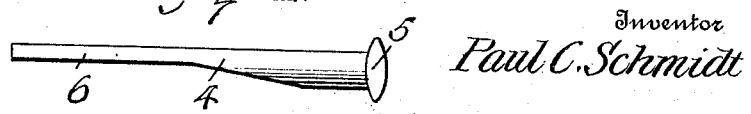

In the drawings accompanying this specification, Figure 1 is a front elevation of a nut having a bolt secured thereon, the said nut being constructed in accordance with the present invention. Fig. 2 is a side elevation of the nut. Fig. 3 is a sectional view taken upon the line 3—3 of Fig. 2. Fig. 4 is a side elevation of the locking pin.

In the accompanying drawings, the numeral 1 designates an ordinary bolt, and 2 an ordinary nut secured upon the bolt. The nut 2 is provided with one or more openings arranged tangentially to the threaded bore of the nut and partially intersecting the said bore.

The numeral 3 designates a locking pinhole. The pin is provided with a head 5 and has its body portion a suitable distance away from the said head undercut to provide a reduced extension 6. The locking pin 4 is constructed of some soft metal suitable for the purpose, and when inserting the pin through the opening 3, the metal from which the pin is formed will divide when contacting with the threads of the bolt. The reduced extension 6 of the said locking pin is adapted to be bent upon one of the faces of the bolt to secure the said pin thereon.

From the above description, taken in connection with the accompanying drawings, the simplicity of the device, as well as the advantages thereof, will, it is thought, commend themselves to those skilled in the art to which such inventions appertain, and while I have illustrated and described the preferred embodiment of the improvement, as it now appears to me, changes in the minor details of construction, as to size, shape, proportion, material, etc., which fall within the scope of the appended claim, may be made if desired.

Having thus fully described the said invention, what I claim is:—

In combination with a threaded bolt and a nut for the bolt, said nut being formed with an opening arranged at a tangent to the bore of the nut and partially intersecting the said bore, a locking pin being constructed of suitable material and comprising a body portion having a reduced extension, said pin when inserted within the bore adapted to have its body spread or divided by the threads of the bolt, and the reduced extremity of the pin adapted to be bent against one of the faces of the nut.

In testimony whereof I affix my signature in presence of two witnesses.

PAUL C. SCHMIDT.

Witnesses:
W. W. BENNETT,
CATHERINE SERVISS.